(No Model.)

C. WENZEL.
PANTS PROTECTOR.

No. 309,116. Patented Dec. 9, 1884.

WITNESSES:
Jos. N. Rosenbaum.
Ernst Wolff.

INVENTOR
Charles Wenzel
BY
Goepel & Raegener
ATTORNEYS.

UNITED STATES PATENT OFFICE.

CHARLES WENZEL, OF NEW YORK, N. Y.

PANTS-PROTECTOR.

SPECIFICATION forming part of Letters Patent No. 309,116, dated December 9, 1884.

Application filed October 20, 1884. (No model.)

*To all whom it may concern:*

Be it known that I, CHARLES WENZEL, of the city, county, and State of New York, have invented certain new and useful Improvements in Pants-Protectors, of which the following is a specification.

This invention has reference to an improved device for protecting the lower ends of pantaloons in dirty weather; and the invention consists of a buckle attached to the strap of the shoe, said buckle being provided with a perforated shank, and of an adjustable hook for supporting the lower ends of the pants, the hook being retained higher or lower on the perforated shank by a suitable locking mechanism, and arrested at the lower end of the shank by a stop device.

Figure 1:
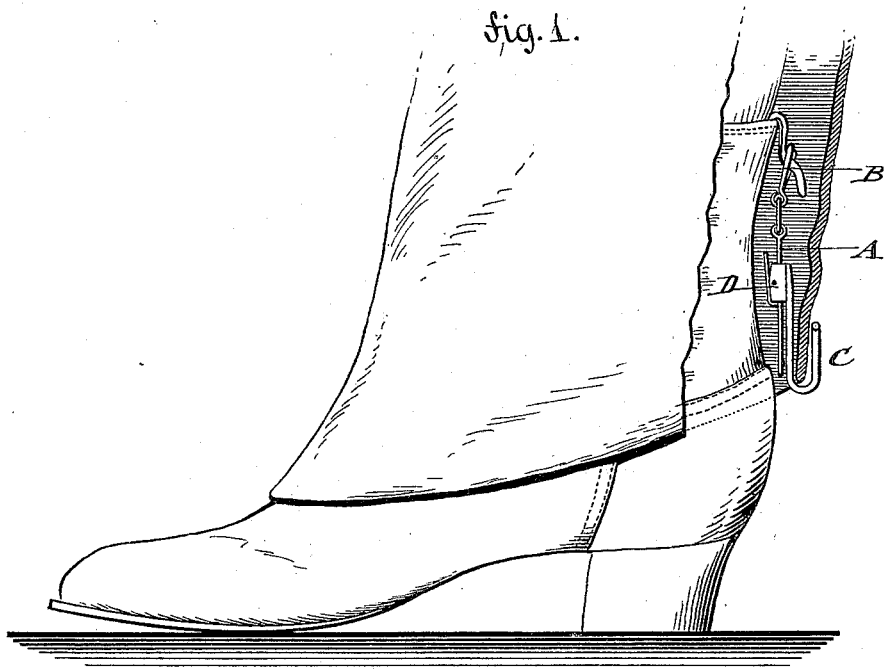
Figure 2:
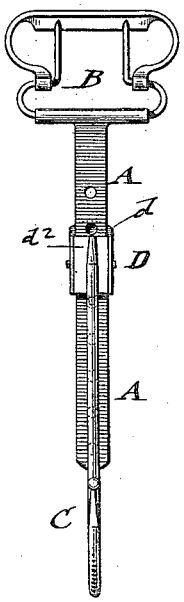
Figure 3:
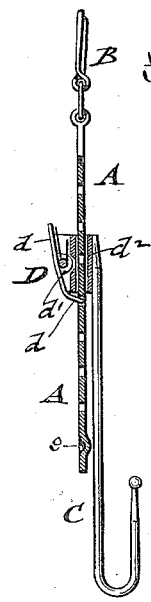

In the accompanying drawings, Figure 1 represents a side elevation of my improved pants-protector, shown in position for use. Fig. 2 is an end view, and Fig. 3 a vertical transverse section, of the same.

Similar letters of reference indicate corresponding parts.

My improved pants-protector is composed of two main parts of a perforated shank, A, to the upper end of which is hinged a buckle, B, and of an adjustable hook, C, that is provided at the upper end of its shank with a locking device, D, for attaching the hook to the perforated shank A, as shown in Fig. 1. The buckle B is applied to the strap or loop of the shoe, while the hook C is applied to the lower rear ends of the pants, so as to raise the same to a sufficient height above the ground.

The locking device D consists of a spring-catch, $d$, that is pivoted by ears $d'$ to side flanges of a plate, $d^2$, attached to the upper end of the hook-shank. The pointed end of the spring-catch $d$ engages any one of the perforations of the shank A, while the upper broader end serves as a finger-rest for withdrawing the locking device from the shank A when adjusting the hook C thereon.

At the lower end of the shank A is arranged a small stop or projection, $e$, which prevents the detaching of the hook C from the shank A and the consequent loss of the same. The hook C is adjusted higher or lower on the shank, according as the pants are to be supported at a greater or smaller distance from the ground.

I am aware that pants-protectors consisting of a buckle and a hook or hooks applied rigidly to the same have been used heretofore, and I do not claim this feature, broadly.

Having thus described my invention, I claim as new and desire to secure by Letters Patent—

1. The combination, in a pants-protector, of a shank having a buckle at its upper end, a hook, and means for locking the hook higher or lower on the shank, substantially as set forth.

2. The combination of a perforated shank having a buckle hinged to its upper end, and an adjustable hook having a spring-catch engaging the perforations of the shank, so as to lock the hook higher or lower on the shank, substantially as set forth.

3. The combination of a perforated shank, A, having a hinged buckle, B, at its upper end, and a stop, $e$, at its lower end, and an adjustable hook, C, having a pivoted and pointed spring-catch, $d$, at the upper end of the shank, substantially as set forth.

In testimony that I claim the foregoing as my invention I have signed my name in presence of two subscribing witnesses.

CHARLES WENZEL.

Witnesses:
PAUL GOEPEL,
SIDNEY MANN.